(12) United States Patent
Søvik

(10) Patent No.: US 6,508,030 B1
(45) Date of Patent: Jan. 21, 2003

(54) PROCESS FOR FASTENING OF A STOP ARRANGEMENT TO A LINE AND A LINE HAVING A STOP ARRANGEMENT CONNECTED THERETO

(76) Inventor: Magne Søvik, N-6386, Måndalen (NO)

( * ) Notice: Subject to any disclaimer, the term of this patent is extended or adjusted under 35 U.S.C. 154(b) by 0 days.

(21) Appl. No.: 08/602,781
(22) PCT Filed: Oct. 5, 1994
(86) PCT No.: PCT/NO94/00161
§ 371 (c)(1),
(2), (4) Date: Mar. 7, 1996
(87) PCT Pub. No.: WO95/09530
PCT Pub. Date: Apr. 13, 1995

(30) Foreign Application Priority Data

Oct. 6, 1993 (NO) ................................. 933567
Dec. 23, 1993 (NO) ................................. 934788

(51) Int. Cl.$^7$ ............................................. A01K 91/047
(52) U.S. Cl. .......................... 43/42.74; 24/908; 43/44.9; 43/44.84; 43/44.85
(58) Field of Search ............................ 43/44.84, 44.85, 43/44.86, 44.83, 42.74, 44.9; 24/908; 129 W, 129 A

(56) References Cited

U.S. PATENT DOCUMENTS

| | | | | |
|---|---|---|---|---|
| 1,905,449 A | * | 4/1933 | Dunn | 43/44.85 |
| 2,466,939 A | * | 4/1949 | Flower | 43/44.85 |
| 2,545,326 A | * | 3/1951 | Westfall | 43/44.85 |
| 2,908,989 A | * | 10/1959 | Povinelli | 43/42.74 |
| 3,164,922 A | * | 1/1965 | Kearns | 43/44.85 |
| 3,453,703 A | * | 7/1969 | Wilson | 43/44.85 |
| 3,533,184 A | * | 10/1970 | Kerr | 43/44.84 |
| 3,638,975 A | * | 2/1972 | Buettner | 24/115 A |
| 4,149,336 A | * | 4/1979 | Huse | 43/44.84 |
| 4,428,143 A | * | 1/1984 | Keller | 43/44.9 |
| 4,829,696 A | * | 5/1989 | Sörensen | 43/44.84 |
| 4,945,671 A | * | 8/1990 | Jonsson | 43/44.84 |
| 5,251,396 A | * | 10/1993 | Haigh | 43/42.74 |

FOREIGN PATENT DOCUMENTS

| | | | | |
|---|---|---|---|---|
| GB | 18962 | * | 10/1892 | 43/44.85 |
| WO | 92/01372 | * | 2/1992 | 43/42.74 |

* cited by examiner

*Primary Examiner*—Kurt Rowan
(74) *Attorney, Agent, or Firm*—Francis C. Hand; Carella, Byrne et al

(57) ABSTRACT

A process is provided for fastening a stop arrangement to a line with an associated swivel and snell on the line. The stop arrangement is initially in a closed annular shape and is secured to the line by deformation of the stop arrangement via at least one annular portion of the stop arrangement at the same time, one or more support portions are provided for the mounting of a clip directly to the stop arrangement (17"). A connecting arrangement between line and snell comprises the aforementioned stop arrangement and the aforementioned clip.

20 Claims, 3 Drawing Sheets

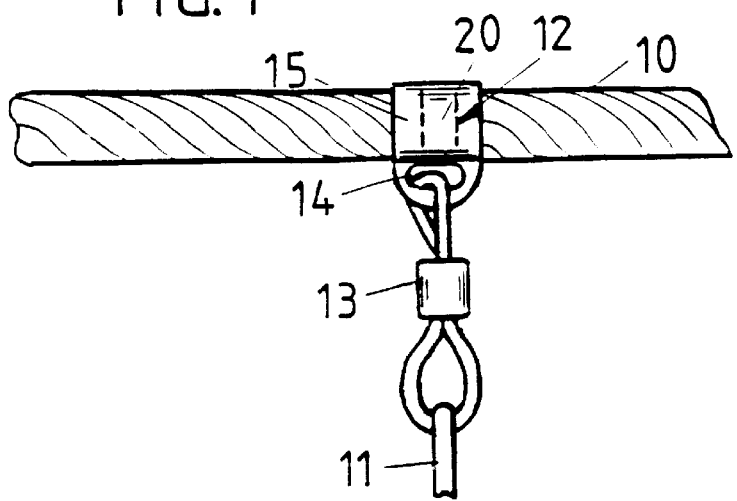
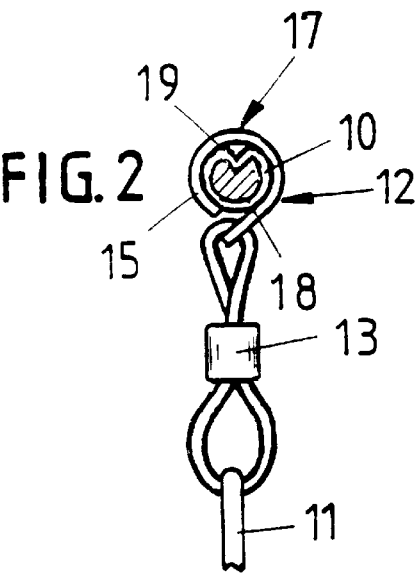
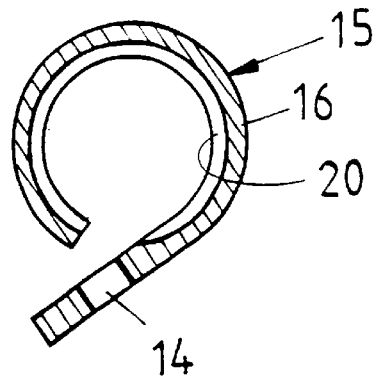
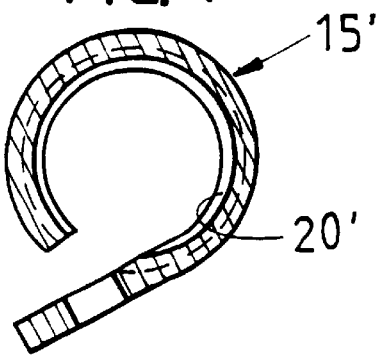

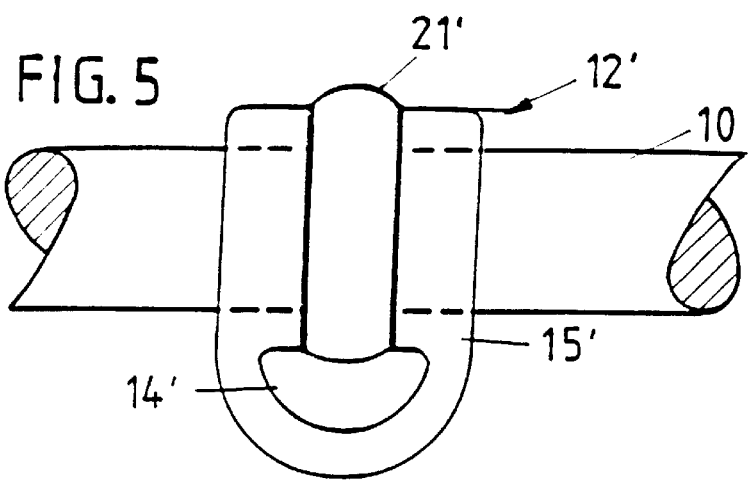
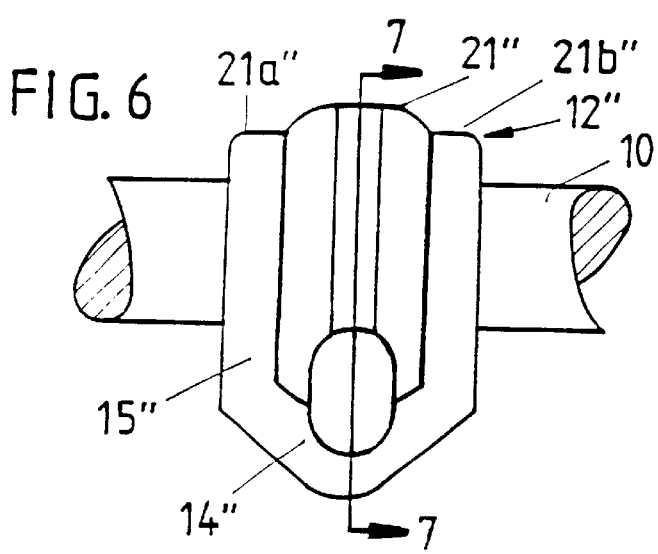
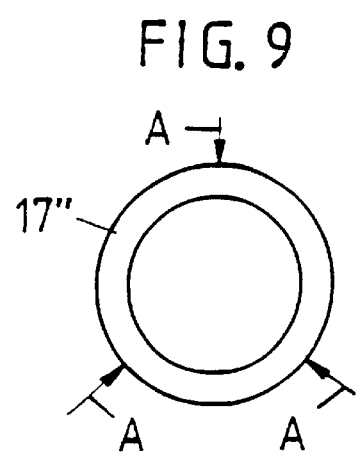
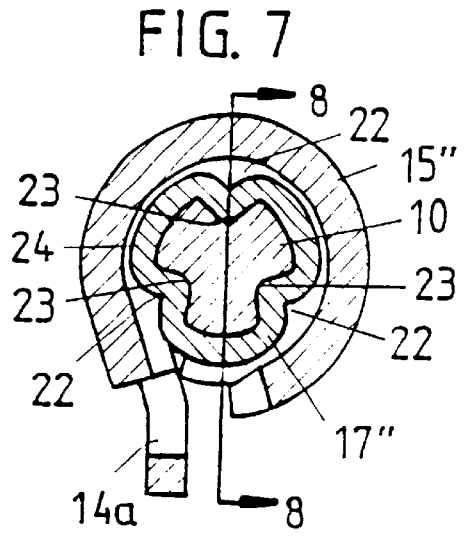
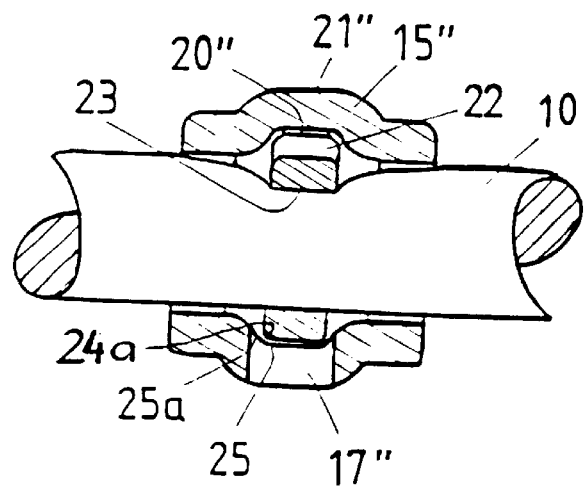

PROCESS FOR FASTENING OF A STOP ARRANGEMENT TO A LINE AND A LINE HAVING A STOP ARRANGEMENT CONNECTED THERETO

The present invention relates to a process for fastening of a rigid, shape-stable stop arrangement to a line, especially for closing off or anchoring a rigid, shape-stable clip having associated swivel and snell, rotatably mounted about the line.

The present invention is consequently directed more particularly to a process for fastening said stop arrangement, which is included in line fishing equipment which forms the connection between the line and associated fishing hooks each fastened to the line via its respective swivel and intermediate snells which are fastened to the fishing hook.

In addition the invention relates to a line having snell connected thereto, where the snell is connected via a swivel with a clip, which cooperates with a rigid, shape-stable stop arrangement which is secured to the line.

Hitherto there have been proposed a series of different stop arrangements and different ways of fastening such stop arrangements to a line and different ways for connecting the stop arrangement to associated clips and different ways of fastening such connecting arrangements at specific positions on the line.

In GB 2 074 027 two opposite stop arrangements are proposed which are fastened individually to the line and where the swivel itself is fastened rotatably mounted directly on the line, without intermediate clips.

In U.S. Pat. No. 4,023,302 there is pivotally mounted on the line between two opposite stop arrangements a spherical connecting arrangement having an annular groove for receiving an attachment noose which is arranged at the end of the snell.

In FR 2 629 984 a stop arrangement is fastened on the line in the form of a first stop member having a U-shaped cross-section for installing the line sideways in the stop arrangement and a second insert member which is adapted to be snapped into engagement with the first stop member for locking the stop arrangement to the line in an immovable manner. A clip is adapted to be received pivotally mounted in an annular groove on the periphery of the stop arrangement, a clip being snapped in place an the stop arrangement in an annular locking engagement.

In GB 2 035 021 a stop arrangement is shown of split ring form which receives pivotally mounted in an annular peripheral groove a connecting arrangement in the form of a split sleeve and an equivalent split fastening portion projecting laterally outwards for the fastening means of the snell.

In the known constructions various types of stop devices are employed. According to a first example two clamp members of plastic are employed, which are squeezed into a snap engagement with each other from each side of the line. According to a second embodiment the stop devices are cast in place on the line. By the use according to a third embodiment of corded material a portion of the stop device is thrust inwardly into the cross-section of the line or a connecting means is fastened through the stop device and inwardly into the line.

In WO-A-92/01372 two opposite stop means are proposed which are fastened individually to the line and where a clip or split ring means is fastened rotatably mounted directly on the line between said stop means. Each stop means is illustrated in the shape of a clip, the opposite ends of which each is provided with an inwardly extending, inturned end portion to be inserted in the line. The clip is being clamped into ring-shape simultaneously as the end portions are penetrating into the line or into the strands of the line. Said penetration may damage the line or the strands of the line and/or may cause a restricted fastening of the stop means to the line.

In all the known solutions the forces which can be transferred from the stop device to the line without the line being destroyed or without the stop device being destroyed are thus limited.

With the present invention, the aim first and foremost is a solution where the stop device or stop devices can be fastened in a stable and reliable manner, without damaging the line, and with the possibility of transferring relatively large forces between the stop device and the line brought about by tension in a snell via a swivel and an associated clip.

The afore-mentioned object is achieved according to the invention by a process of the kind indicated by way of introduction, which is characterised in that the rigid, shape-stable stop arrangement is made of corded material in shape of a deformed closed ring, is mechanically secured to the line by said deformation, and that a clip is anchored directly on and rotatably mounted directly on the stop arrangement or is rotatably mounted about the line and is closed off in an intermediate space between two stop arrangements.

By means of suitable tools, the stop arrangement or the stop arrangements can be secured in a rapid and effective and at the same time reliable and gentle manner on the line, in readiness for the transfer of partly large forces in the longitudinal direction of the line to the stop arrangement or the stop arrangements.

In known constructions there is used for example a clip which is closed off between two separate stop arrangements or which is pivotally mounted with bearing portions which are arranged on each side of a common, intermediate clip or a clip which is closed off externally on the stop arrangement.

The process according to the invention can be used for fastening stop arrangements for all the three such modes of fastening mentioned.

In NO 170 663 a stop arrangement is employed in the form of a metal ring having a spherical outer surface. It is not stated concretely with which fastening means the stop arrangement is fastened to the line. Furthermore there is employed a clip in the form of a claw-shaped body, which has an equivalent spherical inner surface, in order to be able to permit rotatable mounting of a clip on the metal ring with the spherical surface. The claw-shaped body has an inherent elasticity, so that it can be snapped into engagement with the stop arrangement. This solution has the weakness that as a result of the snapping action, based on the inherent elasticity of a clip, it is not sufficiently stable as to shape and therefore is not adapted to transfer significant forces between clip and stop arrangement. The solution will therefore be unsuitable for line fishing at large ocean depths. In addition relatively sharp end edges of a clip can be freely pivoted inwardly into the line and damage this.

In U.S. Pat. No. 2,908,989 a stop arrangement is shown in the form of a knot made by means of the line itself and where a disc for the fastening of snells is pivotally mounted directly on the knot on the line. The line illustrated is not designed for use for commercial line fishing, but on the other hand is designed for a line for use in angling.

With the present invention the aim as a further aspect is to produce a simpler connecting arrangement which provides a better, that is to say stronger and thereby more reliable fastening for the snell on the line and which provides a simpler and more robust connection between stop arrangement and clip.

The process according to the invention is in this connection characterised in that a clip, which initially is approximately C-shaped or U-shaped, is mechanically fastened in place on the stop arrangement in a surrounding, rotatably mounted engagement with the latter, by deformation of a clip to an approximately or substantially annular contour.

The line according to the invention is characterised in that the rigid, shape-stable clip on deforming the material of the clip is mechanically secured directly on the stop arrangement in a rotatable engagement with the latter, a clip covering parts of the line and the intermediate stop arrangement, while a clip projects with its end edges a distance axially outside the stop arrangement and surrounds parts of the line at a certain radial distance form the latter, and the stop arrangement is received in a middle, internal guide groove, which is defined an axial distance within end edges of a clip, so that the stop arrangement and the middle guide groove jointly guide a clip pivotally mounted relative to the stop arrangement.

According to the invention there is achieved a surprisingly simple and effective solution with favourable effects, particularly with respect to strength in order to take up particularly large weight and tension loadings. The solution also provides the basis for remaining favourable use characteristics, such as ready pivotal mounting and ready control in different directions relative to the line, together with the possibility of preventing wear of the line during use.

With a simple and compact annular stop arrangement, which has a minimal dimension in the longitudinal direction of the line, one can according to the invention anchor a clip on the stop arrangement in an effective manner with the possibility of a large transfer of force between clip and stop arrangement and further directly to the line, while the stop arrangement can transfer loading forces in an effective manner in arbitrary directions from a clip to the line via a guide groove of the clip and the stop arrangement centrally arranged in the latter. According to the invention a clip can also be produced with an especially simple, robust design by way of simple means.

In addition, it is easier to achieve an effective control by employing a sole, simple stop arrangement and opposite end stops internally in a clip, than by employing a clip which is controlled between two end stops in a sleeve-shaped stop arrangement of known construction. But the stop arrangement can with advantage also find application as end stops on each side of a separate rotatably mounted clip.

The guide groove can be milled out or hollowed out in another way in the material of the clip on the inner side of the clip with an equivalently reduced wall thickness at the guide groove. This can be appropriate in lines which are exposed to limited tension forces.

In lines which are exposed to strong tension forces however it is preferred that the guide groove is pressed out of the clip material without substantially reducing the wall thickness of a clip, but with a form which provides extra support and reinforcement of the annular shape of a clip.

It is preferred that the stop arrangement has a substantially rectangular cross-section. There can hereby be ensured an effective engagement between line and stop arrangement and in addition great inherent rigidity can be achieved in the stop arrangement.

In this connection, the connecting arrangement is characterised in that the stop arrangement is formed with two or more depressions on the outer periphery of the ring shape and equivalently with two or more projections on the inner periphery of the ring shape and with substantially circular arcuate portions between the depressions on the outer periphery of the ring shape, the projections forming anchoring means of the stop arrangement on the line, while the substantially circular arcuate, outer portions constitute a substantial proportion of the radially outermost peripheral portion of the ring shape for controlling a clip on the stop arrangement.

By employing initially an annular stop arrangement, the stop arrangement can first be easily threaded into place on the line and by deforming the stop arrangement the latter can be effectively fastened in place at the intended location on the line. Finally, by deforming of a clip the latter can be clamped in place in an easy and accurate manner in a rotary engagement with the stop arrangement, controlled via the internal guide groove.

In the following there will be described a preferred embodiment according to the invention having regard to the accompanying drawings, in which:

FIG. 1 shows in side view a connecting arrangement, illustrated in combination with a line fragment and a snell.

FIG. 2 shows in cross-section the same as in FIG. 1.

FIG. 3 shows in cross-section in a first embodiment a clip which forms a part of the connecting arrangement.

FIG. 4 shows in cross-section in a second embodiment a clip which forms a part of the connecting arrangement.

FIG. 5 shows in a side view a clip according to FIG. 4 illustrated in combination with a line fragment.

FIG. 6 shows in a side view a third embodiment of a connecting arrangement in combination with a line fragment.

FIG. 7 shows a cross-section along the line 7—7 of FIG. 6.

FIG. 8 shows a longitudinal section along the line 8—8 of FIG. 7.

FIG. 9 shows a cross-section of a clip as illustrated in FIG. 7 in an inactive, unaffected condition.

Figure 10:
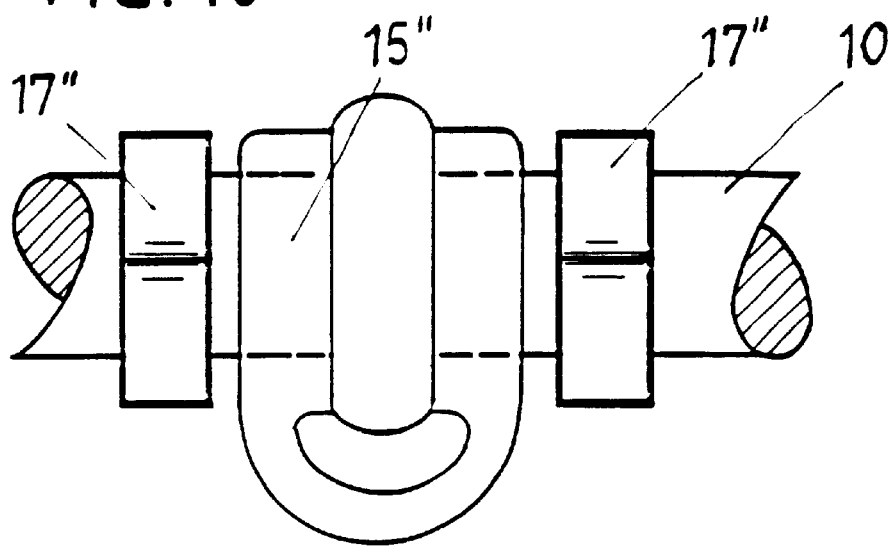
FIGS. 10 and 11 show in side view a fourth and a fifth embodiment of a connecting arrangement in combination with a line fragment.

In FIGS. 1 and 2 a fishing line 10 is shown with associated snell 11. The snell 11 is provided at the free end with a fishing hook (not shown) in a manner not shown further. The snell 11 is connected to the fishing line 10 by means of a connecting arrangement 12. The connecting arrangement 12 shall allow rotation of the snell 11 about its own axis and shall allow in addition swinging of the snell 11 about the axis of the line 10, at the same time as the snell 11 is to be retained in place in the intended position on the fishing line 10.

The connecting arrangement 12 comprises a swivel 13 in the usual way, which is directly connected at the one end to the snell 11 (in a manner not shown further) and is connected at the other end via an elongate fastening eye 14 in an outwardly extending tail portion of a clip 15. The clip 15 is fastened in place around the line 10 via a split-up clip ring portion 16.

According to a first embodiment, as shown in FIG. 2, the connecting arrangement 12 further comprises a stop arrangement 17 in the form of a simple, corded body. The corded body is made in the first embodiment in the form of a closed ring. In a local portion 19, as shown in FIG. 2, the ring is pressed inwardly into the line 10 substantially across the latter. At the same time as the pressing in of the ring portion 19 is effected radially inwards into the line 10 by means of a suitable tool, the remainder of the ring forms a resistance to such a pressing in by a supporting abutment around the periphery of the line and with this becomes effectively clamped against the line with a ring portion 18, which surrounds the major portion of the periphery of the line in tight abutment against the latter. The projecting ring portion 19 and the substantially circularly shaped ring portion 18 of the stop arrangement 17 are arranged in one and the same plane at right angles to the line 10.

According to the invention a ring portion 16 of a clip 15 is designed with an internal, annular groove 20, which forms a guide groove for a clip 15 relative to ring portion 18 of the stop arrangement 17.

It is possible to clamp the clip 15 in place directly on the stop arrangement 17 after the latter is fastened beforehand in place on the line, so that the plane through ring portion 18 and ring portion 19 of the stop arrangement coincides with a radial plane the internal guide groove 20 of the clip. The clip 15 is adapted to be pivotally mounted on the stop arrangement 17, which on its side is adapted to be effectively anchored to and buttressed against the line 10. The groove 20 can consequently allow the clip 15 to ride on the stop arrangement 17 without forming an abutment against the line 10 itself. By means of the annular groove 20 and the annular portion 18 an accurately adapted mounting of the clip 15 on the stop arrangement 17 can be ensured and at the same time an effective mutual buttressing ensured which can provide an effective transfer of force from the clip 15 to the stop arrangement 17 of the forces which necessarily arise in the connecting arrangement 12 during use.

By employing an annular stop arrangement 17 unnecessary deformation of the line 10 can be avoided with the ring portion 19 at the same time as ensuring effective fastening of the stop arrangement 17 to the line. The ring portion 18, which forms a support against the line, supports the deformed portion 19 in an effective manner in the line 10 by a cooperation between the external clip 15 and the internal stop arrangement 17. However this type of stop arrangement is preferred, with only one radial projection, on such lines where a relatively low tensile force is exerted between the snell 11 and the fishing line 10 via the connecting arrangement 12. Below reference will be made to examples with several radial projections.

In FIG. 3 a clip 15 is shown, where the groove is milled or hollowed in another way from the sheet material of the clip 15. There is hereby obtained a smooth outer surface on a clip 15, but simultaneously a smaller wall thickness in the region of the groove 20. Below reference will be made to examples having reinforced walls in the region of the groove 20.

In FIG. 4 a second construction of a clip 15' is shown, where the groove 20' is produced by a deformation of the sheet material of the clip, without weakening a clip 15'. By this a clip 15' can have the same wall thickness at the end edges as at the middle, where the groove 20' is formed. In this case a relatively small, low bead 21' is obtained on the outer side of a clip 15', as is shown in FIG. 5. Consequently the bead 21' can in addition serve to reinforce a clip 15' in its flexed annular use condition. There is shown a circular arcuate bead in FIG. 5, where a clip 15' is seen from the side and fastened in place in the use position on the line 10.

In FIG. 6 a clip 15" is shown in side view, according to a third embodiment. Bead 21" of a clip 15" is shown having substantially the same height, as illustrated for bead 21' of a clip 15' in FIG. 5, but with significantly greater breadth. A clip 15" has besides the same breadth, as shown in FIG. 4, but with correspondingly shorter side flaps 21a" and 21b" at the side of the bead 21". In order that the outwardly projecting flap portion of a bead shall project outwards as little as possible, the fastening eye 14' can be designed as is shown in FIG. 5 or the fastening eye 14" can be designed as is shown in FIG. 6, where the fastening eye 14" is partly hollowed out of the bead 21" itself.

In FIG. 7 there is shown a cross-section of a clip 15' and an associated stop arrangement 17", according to a second embodiment, while in FIG. 8 there is correspondingly shown the stop arrangement 17", which is illustrated with an approximately rectangular cross-section. Initially the stop arrangement 17" has, as is shown in FIG. 9, a circular ring form. By three arrows A there are indicated schematically in FIG. 9 three clamp parts of a tool for jamming/deforming the stop arrangement 17" in place on the line 10. The tool (not shown further) can have three clamp jaws (illustrated by the arrows A) with a clamp portion corresponding to the depressions 22 which are shown on the peripheral portion of the stop arrangement 17" in FIG. 7.

In FIG. 7, after deforming and thereby fixing the stop arrangement 17" on the line, the stop arrangement 17" is shown with an approximately trefoil-shaped annular cross-section. The stop arrangement 17" is fixed/deformed in place on the line 10 by means of the three depressions 22 illustrated. By designing the stop arrangement 17" with a substantially rectangular cross-section, one has the possibility of being able to deform the stop arrangement in a controlled manner and simultaneously ensure an effective supporting abutment via a relatively large support surface on the inner side of the stop arrangement at each of the deformed, inwardly directed projections 23 of the stop arrangement 17". By limiting the deforming surfaces of the clamp jaws to an extent corresponding to the illustrated depressions 22 and by extending in addition the clamp jaws sideways a supporting abutment can be achieved at the side of the non-deformed portions 24 of the outer side of the stop arrangement 17". Thereby a controlled deforming of the annular shape of the stop arrangement 17" to a substantially trefoil shape as shown in FIG. 7. Alternatively there can be employed substantially a heart shape or kidney shape, two-leaf shape or four-leaf shape or like leaf shape. Consequently one has been able to ensure in a ready manner a sharply defined, wedge-shaped depression 22 on the outer side, but at the same time a uniform and relatively gently rounded projection 23 on the inner side. A particularly gentle, but especially effective clamping engagement with the line 10, can hereby be achieved without the danger of damaging individual filaments of the line 10 and with a minimal possibility of moving the stop arrangement 17" relative to the line. This has appreciable significance on using the line at large ocean depths, where considerable tensile loadings can be transferred in the line and in addition large tensile forces in the snell 11 via a clip 15".

Provision is made for the non-deformed portions 24 of the stop arrangement 17" to collectively constitute the major portion of the angular arc of the stop arrangement 17" in the peripheral direction, in order to ensure thereby an optimum support surface for a clip 15".

By means of the rectangular shape of the stop arrangement 17" and an equivalent plane inner side surface 25 of the middle portion of a clip 15", an effective mutual supporting abutment between clip 15" and stop arrangement 17" in the arbitrary rotary positions of a clip 15" on the line 10. By means of rounded transition portions 24a externally on the stop arrangement 17" and rounded transition portions 25a internally in a clip 15" an effective control can be ensured between a clip 15" and a stop arrangement 17" both in the direction along the line 10 and obliquely of the longitudinal direction of the line.

In FIG. 10 a clip 15" is shown fastened in place directly on the line 10 between two stop arrangements 17" which are separately secured correspondingly as described above with reference to the examples of FIGS. 5–9. In this case a clip 15" can be moved a limited distance along the line 10 between the stop arrangements 17" and also be freely swung about the line 10 as required.

Figure 11:
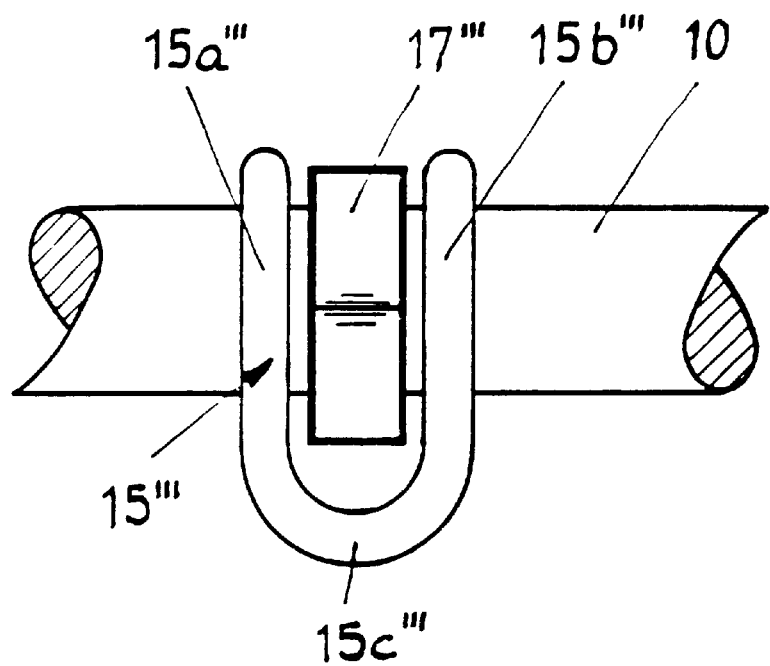

In FIG. 11 another simpler clip 15''' is shown of initially an annular cord which is double-folded into a C shape about the line 10 to form two distinct bearing portions 15a''', 15b''' and two intermediate loops 15c''' (only the one is shown herein). A clip 15''' is pivotally mounted on the line 10 with the bearing portions 15a''' and 15b''' arranged on each side of a common stop arrangement 17'''. In such a case the swivel 13 is hooked in place in a manner not shown further in the two mutually parallel loops 15c''' which depend from the line 10, so that a clip 15''' can be retained on the line 10 by means of the swivel 13.

What is claimed is:

1. In combination, a fishing line; and at least one ring mounted on said line and having at least one peripheral portion deformed radially inwardly into said line to clamp the remainder of said ring peripherally against said line.

2. The combination as set forth in claim 1 wherein said ring is a closed ring.

3. The combination as set forth in claim 1 which further comprises a clip pivotally mounted on said line about said ring, said clip having a ring portion disposed about said line and said ring and an outwardly extending tail portion having an eye therein, said ring portion of said clip having an annular groove receiving said ring.

4. The combination as set forth in claim 3 wherein said annular groove is hollowed out from the remainder of said clip.

5. The combination as set forth in claim 3 wherein said clip is made of sheet metal and a central portion thereof is deformed to define said annular groove.

6. The combination as set forth in claim 3 which further comprises a swivel connected to said tail portion of said clip and a snell connected to said swivel.

7. The combination as set forth in claim 1 wherein said ring has a trefoil-shaped annular cross-section defining three depressions deformed radially inwardly into said line.

8. The combination as set forth in claim 7 wherein said ring has a rectangular cross-section.

9. The combination as set forth in claim 7 which further comprises a clip pivotally mounted on said line about said ring, said clip having a ring portion disposed about said line and said ring and an outwardly extending tail portion having an eye therein, said ring portion of said clip having an annular groove receiving said ring.

10. The combination as set forth in claim 9 wherein said annular groove is hollowed out from the remainder of said clip.

11. The combination as set forth in claim 9 wherein said clip is made of sheet metal and a central portion thereof is deformed to define said annular groove.

12. The combination as set forth in claim 3 wherein said ring has a rectangular cross-section and said ring portion of said clip has a central portion forming an annular groove receiving said ring therein in a mutual supporting relation.

13. The combination as set forth in claim 1 comprising a pair of said rings clamped to said line in spaced relation and a clip pivotally mounted on said line between said rings, said clip having a ring portion disposed about said line and an outwardly extending tail portion having an eye therein.

14. The combination as set forth in claim 1 which further comprises a clip pivotally mounted on said line, said clip having a pair of bearing portions arranged on each side of said ring and about said line and said clip having a pair of parallel loops depending from said line.

15. In combination, a fishing line made of filaments;

at least one ring of corded material mounted on said line and having at least one portion deformed radially inwardly into said line to clamp the remainder of said ring peripherally against said line.

16. The combination as set forth in claim 15 wherein said ring has a rectangular cross-section.

17. The combination as set forth in claim 15 wherein said ring has a trefoil-shaped annular cross-section defining three depressions deformed radially inwardly into said line.

18. A clip for a fishing line comprising a ring portion for disposition about a fishing line, said ring portion having an internal annular groove in a central region; and a tail portion extending from said ring portion, said tail portion having an eye therein.

19. A clip as set forth in claim 18 wherein said annular groove is hollowed out from the remainder of said clip.

20. A clip as set forth in claim 18 wherein said clip is made of sheet metal and a central portion thereof is deformed to define said annular groove.

* * * * *